United States Patent
Thompson et al.

(10) Patent No.: US 10,125,777 B2
(45) Date of Patent: Nov. 13, 2018

(54) DRIVE SYSTEM FOR AN AGRICULTURAL PRODUCT DISTRIBUTION SYSTEM

(71) Applicant: CNH Industrial Canada, Ltd., Saskatoon (CA)

(72) Inventors: Dennis George Thompson, Saskatoon (CA); Syed Fazal Abbas, Saskatoon (CA); Ka Po Catherine Hui, Saskatoon (CA)

(73) Assignee: CNH Industrial Canada, Ltd., Saskatoon, Saskatchewan (CA)

(*) Notice: Subject to any disclaimer, the term of this patent is extended or adjusted under 35 U.S.C. 154(b) by 347 days.

(21) Appl. No.: 14/931,532

(22) Filed: Nov. 3, 2015

(65) Prior Publication Data

US 2016/0123330 A1    May 5, 2016

Related U.S. Application Data

(60) Provisional application No. 62/075,180, filed on Nov. 4, 2014.

(51) Int. Cl.
| | |
|---|---|
| *F04D 25/04* | (2006.01) |
| *F04D 25/06* | (2006.01) |
| *A01C 7/08* | (2006.01) |
| *A01C 15/04* | (2006.01) |
| *A01C 19/02* | (2006.01) |
| *F04D 29/28* | (2006.01) |
| *F04D 29/42* | (2006.01) |

(52) U.S. Cl.
CPC .............. *F04D 25/06* (2013.01); *A01C 7/081* (2013.01); *A01C 15/04* (2013.01); *A01C 19/02* (2013.01); *F04D 25/04* (2013.01); *F04D 29/282* (2013.01); *F04D 29/4226* (2013.01); *F05D 2260/406* (2013.01)

(58) Field of Classification Search
CPC ......... A01C 7/081; A01C 7/082; A01C 19/02; F04D 25/04; F04D 25/06
See application file for complete search history.

(56) References Cited

U.S. PATENT DOCUMENTS

| | | | |
|---|---|---|---|
| 4,254,843 A * | 3/1981 | Han .................... | B60K 1/00 180/165 |
| 4,373,482 A * | 2/1983 | Goscenski, Jr. ....... | B60K 11/04 123/195 A |
| 4,441,462 A * | 4/1984 | Budinski ............... | F01P 7/044 123/41.11 |
| 4,944,637 A * | 7/1990 | Fletcher ............... | A01C 7/081 239/142 |
| 5,125,797 A * | 6/1992 | Kapich ................ | A62C 3/0207 415/202 |
| 5,296,746 A | 3/1994 | Burkhardt | |

(Continued)

*Primary Examiner* — Patrick Hamo
(74) *Attorney, Agent, or Firm* — Rebecca L. Henkel; Rickard K. DeMille

(57) ABSTRACT

An agricultural product distribution system includes a fan configured to provide an air flow that fluidizes and transports particulate material throughout the agricultural product distribution system. The fan includes an impeller, an inlet position on a first axial side of the fan, and an outlet position on a peripheral side of the fan. The agricultural product distribution system includes a power transfer shaft having a first end non-rotatably coupled to the impeller, wherein the power transfer shaft extends through the inlet of the fan.

12 Claims, 4 Drawing Sheets

(56) References Cited

U.S. PATENT DOCUMENTS

| | | | |
|---|---|---|---|
| 5,775,532 A * | 7/1998 | Bullivant | G05D 7/0605 |
| | | | 222/1 |
| 6,138,781 A | 10/2000 | Hakala | |
| 6,193,175 B1 * | 2/2001 | Andersson | A01C 7/044 |
| | | | 222/608 |
| 6,672,342 B2 * | 1/2004 | Nussbaumer | B65D 88/66 |
| | | | 141/348 |
| 7,057,315 B2 | 6/2006 | Ishida et al. | |
| 8,176,797 B2 * | 5/2012 | Henry | G01F 1/06 |
| | | | 198/300 |
| 8,356,532 B1 | 1/2013 | Dailey | |
| 8,436,485 B1 | 5/2013 | Smith | |
| 8,544,425 B2 | 10/2013 | Dorn et al. | |
| 8,766,471 B2 | 7/2014 | Orea | |
| 2010/0034677 A1 | 2/2010 | Uselton | |
| 2013/0113219 A1 | 5/2013 | Honkanen et al. | |

* cited by examiner

DRIVE SYSTEM FOR AN AGRICULTURAL PRODUCT DISTRIBUTION SYSTEM

CROSS-REFERENCE TO RELATED APPLICATION

This application claims priority from and the benefit of U.S. Provisional Application Ser. No. 62/075,180, entitled "DRIVE SYSTEM FOR AN AGRICULTURAL PRODUCT DISTRIBUTION SYSTEM", filed Nov. 4, 2014, which is hereby incorporated by reference in its entirety.

BACKGROUND

The invention relates generally to a metering system for agricultural products and, more particularly, a fan for driving a shaft and/or alternator in an agricultural product distribution system.

A range of agricultural implements have been developed and are presently in use for tilling, planting, harvesting, and so forth. Seeders, for example, are commonly towed behind tractors and may cover wide swaths of ground which may be tilled or untilled. Such devices typically open the soil, dispense seeds in the soil opening, and re-close the soil in a single operation. Seeders may include an air cart and a drill. For example, seeds in seeders are commonly dispensed from bulk seed tanks and distributed to row units by a distribution system. In certain configurations, air carts are towed behind drills to deliver a desired flow of seeds to the row units.

Air carts generally include a seed storage tank, a fan, a metering assembly, and a filling mechanism. The seeds are typically gravity fed from the storage tank to the metering assembly that distributes a desired volume of seeds into an air stream generated by the fan. Air then carries the seeds to the soil via conduits extending between the air cart and the drill. The metering assembly typically includes meter rollers or other metering devices that regulate the flow of seeds based on meter roller geometry and rotational speed.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, an agricultural product distribution system includes an alternator configured to supply electrical power to at least one component of the agricultural product distribution system, a fan configured to provide an air flow that fluidizes and transports particulate material throughout the agricultural product distribution system, a motor configured to drive the fan, and a power transfer shaft non-rotatably coupled to an impeller of the fan, wherein the power transfer shaft is configured to transfer rotational energy from the motor to the alternator.

In another embodiment, an agricultural product distribution system includes a fan configured to provide an air flow that fluidizes and transports particulate material throughout the agricultural product distribution system, wherein the fan includes an impeller, an inlet position on a first axial side of the fan, and an outlet position on a peripheral side of the fan, and a power transfer shaft having a first end non-rotatably coupled to the impeller, wherein the power transfer shaft extends through the inlet of the fan.

In a further embodiment, an agricultural product distribution system includes a fan configured to provide an air flow that fluidizes and transports particulate material throughout the agricultural product distribution system, wherein the fan includes an impeller, an inlet position on a first axial side of the fan, and an outlet position on a peripheral side of the fan, and an alternator configured to supply electrical power to at least one component of the agricultural product distribution system, wherein an input shaft of the alternator is non-rotatably coupled to the impeller on the first axial side of the fan.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The metering assembly that performs the seeding operation may desire electrical power to operate. Accordingly, air carts typically may include a motor (e.g., hydraulic motor) and an alternator that supplies power to various batteries, tools, electric motors, or equipment. For instance, the motor may rotate the impeller of the fan to generate the air flow. In order to power the various batteries, electric motors, tools and equipment, it may be desirable to couple or link the motor with an alternator that can provide electrical power. Traditionally, a belt and/or pulley system has been used to link the motor to the alternator. Additionally, the alternator has been placed on the same side of the fan as the motor. However, this set up resulted in power losses between the belt, pulley, motor, and/or alternator. Accordingly, a process of driving a shaft and/or alternator for a metering system with less power losses is desired.

Figure 1:
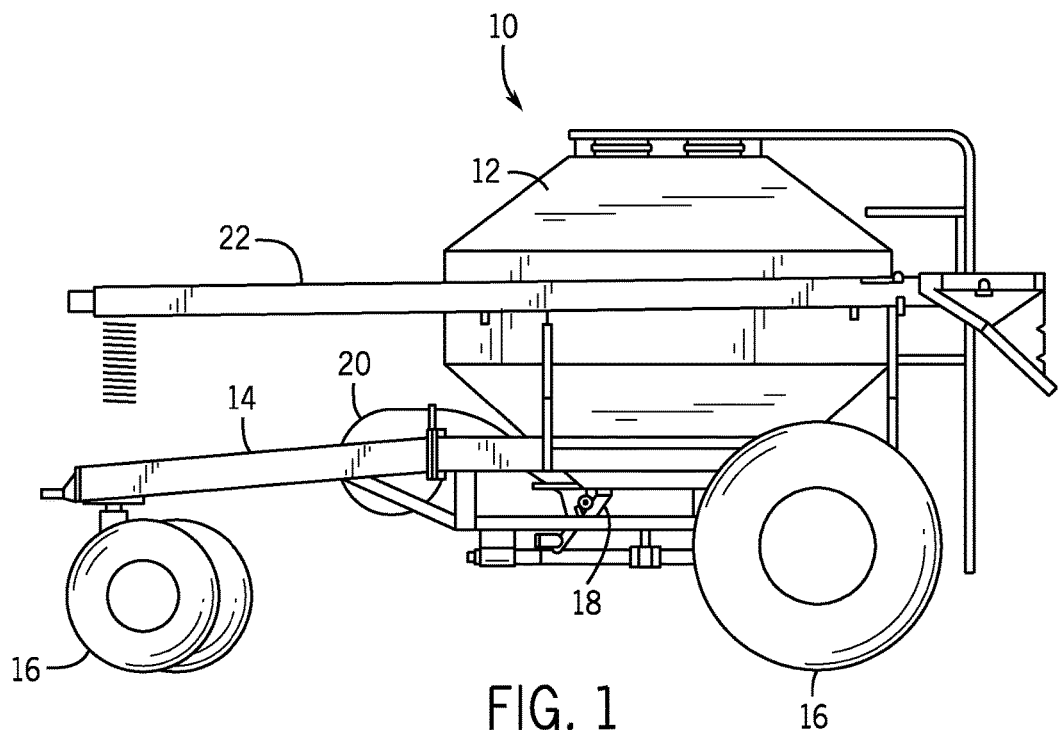
FIG. 1 is a side view of an air cart, including a metering assembly configured to regulate a flow of particulate material with an air source, in accordance with an embodiment of the present disclosure.

Turning now to the drawings, FIG. 1 is a side view of an air cart 10 that may be used in conjunction with a towable agricultural implement to deposit seeds into the soil. For example, certain agricultural implements include row units configured to open the soil, dispense seeds into the soil opening, and re-close the soil in a single operation. Such implements are generally coupled to a tow vehicle, such as a tractor, and pulled through a field. In certain configurations, seeds are conveyed to the row units by the illustrated air cart 10, which is generally towed in sequence with the implement. In alternative configurations, the air cart 10 may be configured to provide fertilizer to the row units, or a combination of seeds and fertilizer.

In the illustrated embodiment, the air cart 10 includes a storage tank 12, a frame 14, wheels 16, a metering assembly 18, a fan system 20 or other air source, and a filling mechanism 22. In certain configurations, the storage tank 12 includes multiple compartments for storing various particulate materials, or products. For example, one compartment may include seeds, such as wheat, and another compartment may include dry fertilizer. In such configurations, the air cart 10 is configured to deliver both the seeds and fertilizer to the implement. The frame 14 includes a towing hitch configured to couple to the implement or tow vehicle. Seeds and/or fertilizer within the storage tank 12 may be fed by gravity and/or negative pressure into the metering assembly 18. The metering assembly 18 includes meter rollers that regulate the flow of material from the storage tank 12 into an air flow provided by the fan system 20. The air flow then carries the material to the implement by pneumatic conduits. In this manner, the row units receive a supply of seeds and/or fertilizer for deposition into the soil.

When the product or products in the storage tank 12 are exhausted or nearly exhausted, the filling mechanism 22 is used to refill the storage tank. The filling mechanism 22 comprises a hopper, an arm, and an auger disposed within the arm. The arm is configured to move, and the movement of the arm may be controlled by an operator. For example, the hopper may be disposed below a transportation truck, or other vessel, such that product flows directly from an outlet located on the bottom of the truck or vessel into the hopper. The auger may then convey product into the storage tank 12. Additionally, if the storage tank comprises multiple compartments as discussed above, the arm may be moved in order to distribute the product into the corresponding compartment.

Figure 2:
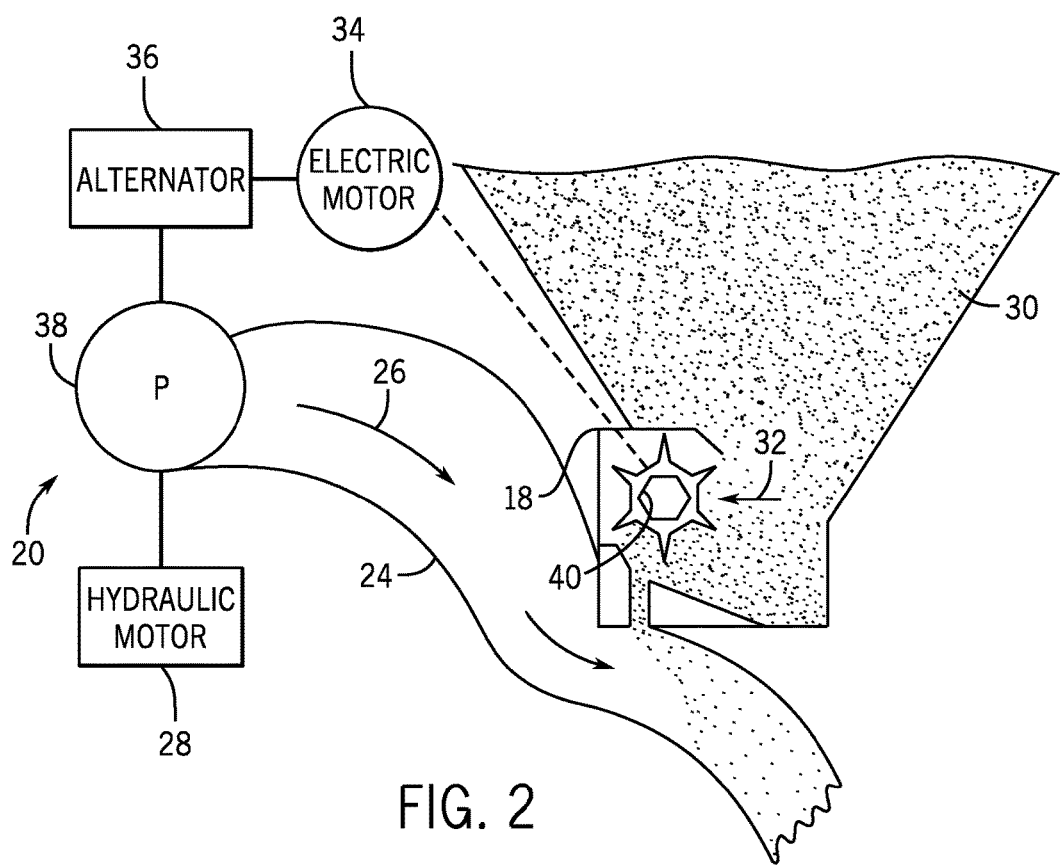
FIG. 2 is a schematic view of the metering assembly, as shown in FIG. 1, including an embodiment of a system for supplying power to the metering assembly.

FIG. 2 is a schematic view of the metering assembly 18, as shown in FIG. 1. As illustrated, the air source (e.g., fan system 20) is coupled to a conduit 24 configured to supply air flow 26 past the metering assembly 18. The air source may be a fan system, pump, or blower powered by a hydraulic motor 28. In one embodiment, the hydraulic motor powering the air source may be part of a primary hydraulic assembly in accordance with the disclosed hydraulic system. Flowable particulate material 30 (e.g., seeds, fertilizer, etc.) within the storage tank 12 flows by gravity into the metering assembly 18. The metering assembly 18 includes one or more meter rollers 32 configured to regulate the flow of material 30 into the air flow 26. More particularly, the metering assembly 18 may include multiple meter rollers 32 disposed adjacent to one another along a longitudinal axis of the rollers 32. For example, certain metering assemblies 18 include seven meter rollers 32. However, alternative embodiments may include more or fewer meter rollers 32, e.g., 1, 2, 3, 4, 5, 6, 7, 8, 9, or more. Further embodiments may include one continuous meter roller 32. In one embodiment, the one or more meter rollers 32, may be powered by one or more electric motors 34, which in turn is powered by an alternator 36. The alternator may be powered by the hydraulic motor 28 as discussed in detail below.

Each meter roller 32 includes an interior cavity 40 configured to receive a shaft that drives the meter roller 32. In the present embodiment, the cavity 40 has a hexagonal cross section. However, alternative embodiments may include various other cavity configurations (e.g., triangular, square, keyed, splined, etc.). The shaft is coupled to a drive unit, such as the electric motor 34, configured to rotate the meter rollers 32. Alternatively, the meter rollers 32 may be coupled to a wheel 16 by a gear assembly such that rotation of the wheel 16 drives the meter rollers 32 to rotate. Such a configuration will automatically vary the rotational speed of the meter rollers 32 based on the travel speed of the air cart 10.

As mentioned above, FIG. 2 shows a fan system 20 having a hydraulic motor 28 configured to drive a fan 38 that performs a primary function of an air cart (i.e. the seeding operation). The hydraulic motor 28 drives an impeller (e.g., blades) of the fan 38. The impeller is non-rotatably coupled to a shaft of the alternator 36. As used herein, non-rotatably coupled refers to coupling a first element to a second element such that the first and second elements rotate together. That is, the first element does not rotate relative to the second element. The alternator 36 supplies electrical power to at least one component of the agricultural product distribution system (e.g., a battery or a motor). For instance, the alternator 36 may supply power to charge a battery of the metering assembly 18. The battery may provide power to an electric motor 34 (e.g., DC motor). Accordingly, the electric motor 34 and the hydraulic motor 28 act together to convey the product from the storage tank 12 to the row units. As shown in FIG. 2, hydraulic fluid enters the hydraulic motor 28 at a specified flow rate and turns a shaft to create the torque sufficient to drive the fan 38 and/or the alternator 36.

Figure 3:
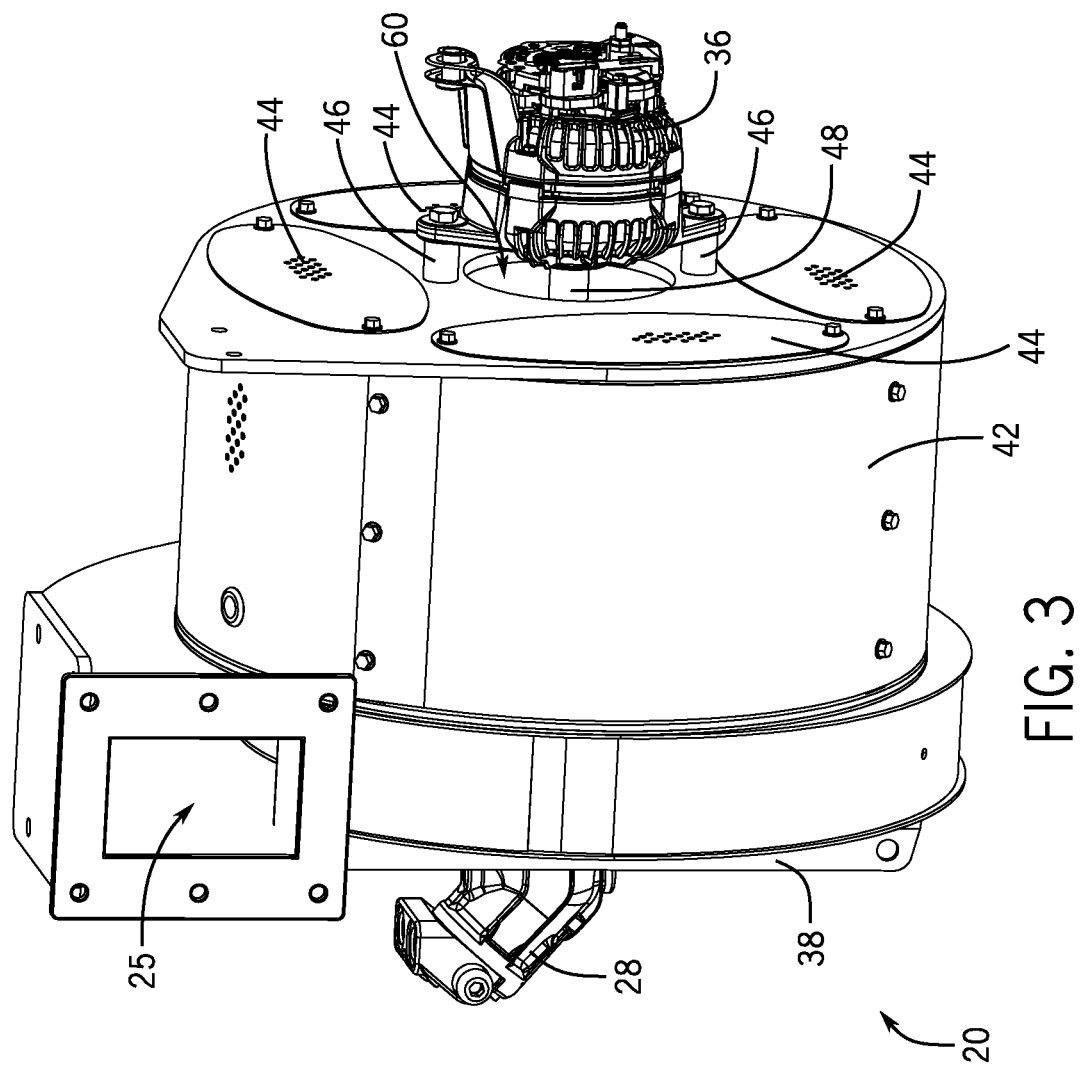
FIG. 3 is a perspective view of a drive system to be used in the metering assembly, as shown in FIG. 1, in accordance with an embodiment of the present disclosure.

FIG. 3 is a perspective view of the driving system in accordance with the present disclosure. The driving system may include, for instance, a fan 38 as the air source. As shown in FIG. 3, the fan motor 28 drives the fan 38. The fan motor 28 may be powered hydraulically, pneumatically, electronically, or the like. The fan motor 28 may be operatively coupled to the fan 38 to cause an impeller of the fan 38 to rotate. The impeller may be used to circulate air. As such, the fan 38 is configured to provide an air flow that fluidizes and transports particulate material throughout the agricultural product distribution system. As the fan rotates, air flows out from an outlet 25 on a peripheral side (e.g., circumferential side) of the fan, and the air is used for the metering assembly 18. A first axial side (e.g., inlet side) of the fan 38 is coupled to a first side of a mesh screen assembly 42. Mesh screens 44 may be included, for instance, on a second side (e.g., alternator side), opposite the first side and extending circumferentially about the assembly 42, to facilitate air flow. The mesh screen assembly 42 supports the alternator 36. The mesh screen assembly 42 may include an L-shaped bracket (not shown) coupled to the fan system to hold the mesh screen assembly 42 in place.

The second side of the mesh screen assembly 42 may be coupled to the alternator 36 via fasteners 46. Any number of fasteners 46 (e.g., 2, 3, 4, 5, 6, or more) may be used to secure the alternator 36 to the screen assembly 42. The screen assembly 42 includes an opening 60 configured to facilitate passage of a power transfer shaft 48 through the mesh screen assembly 42. The power transfer shaft 48 is non-rotatably coupled to a hub and/or other rotating parts of the fan 38 and/or motor 28, such as through an impeller (shown in FIG. 4). More specifically, the impeller of the fan 38 rotates and is driven by the motor 28. As the impeller of the fan 38 is driven to rotate by the motor 28, the impeller of the fan 38 rotates the power transfer shaft 48. The rotation of the power transfer shaft 48 is used to provide mechanical energy (e.g., rotational energy) from the motor to the alternator 36.

The alternator 36 turns the mechanical energy into electrical energy. The alternator 36 may, for instance, include a stator and a rotor. The rotor may include or be coupled to an input shaft and rotate with respect to the stator. The rotor may include, for instance, a permanent magnet. The stator may be, for instance, an armature with stationary windings or a conductor. As the magnet rotates, it may induce a voltage in the conductor to be used to deliver power to at least one component of the agricultural product distribution system (e.g., batteries and/or motors). The alternator 36 may provide alternating current to, for instance, a rectifier (e.g., diode bridge rectifier) to deliver direct current to the battery and/or electronic devices. The alternator 36 may include a rotor and stationary windings. While the present disclosure describes one particular type of alternator 36, any type of alternator 36 may be used that converts mechanical energy into electrical energy.

Further, while some embodiments described herein use a power transfer shaft 48 to drive the alternator 36, the power transfer shaft 48 is merely used for illustrative purposes. In an embodiment, the alternator 36 may be coupled to the fan 38 without the shaft 48. For example, if mesh screen assembly 42 is not used, the alternator 36 may be coupled directly to the fan 38. As such, the input shaft of the alternator 36 is non-rotatably coupled to the impeller on a first axial side of the fan 38. In such configurations, the alternator 36 may be coupled directly to the first axial side of the fan with an input shaft of the alternator 36 (e.g., the input shaft may extend through the fan 38 to the impeller and be driven to rotate by the impeller).

Moreover, while the embodiments herein use an alternator, the present disclosure is not meant to be limited as such. For instance, in an embodiment, a shaft 48 is used to drive other components of the metering system (e.g., the meter roller 32) without the alternator. As such, the power transfer shaft 48 is driven on the inlet side of the fan 38. The rotation of the power transfer shaft 48 may provide mechanical energy to other parts of the metering system (e.g., meter rollers) on the inlet side of the fan 20.

Figure 4:
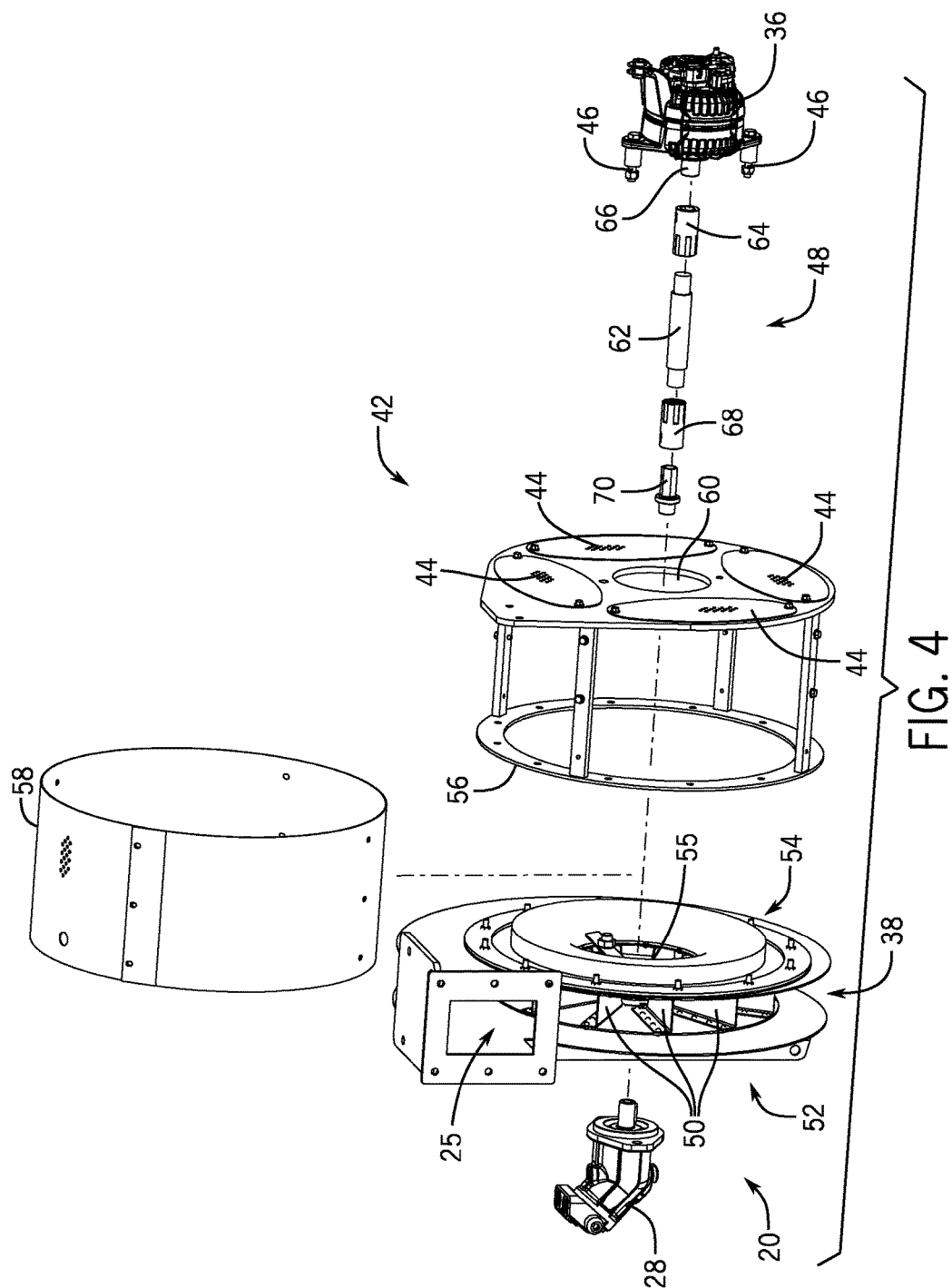
FIG. 4 is an exploded perspective view of the drive system in FIG. 3, in accordance with an embodiment of the present disclosure.

FIG. 4 is an exploded perspective view of the driving system to be used in the metering assembly with the exterior housing of the fan removed. As discussed above, the motor 28 may be connected to the center of the fan 38 (e.g., hub) to turn the impeller 50. More specifically, the fan 38 includes a first axial side 54 (e.g., inlet side) and a second axial side 52 (e.g., back side), opposite the first axial side 54. An inlet 55 position of the first axial side 54 draws air into the fan 38 for provision to exist at the outlet 25. The fan motor 28 is coupled to the impeller 50 on the second axial side 52. Further, on the first axial side 54, the fan 38 is coupled to the frame 56 of the mesh screen assembly 42. The mesh screen assembly 42 includes a frame 56 and one or more mesh screens, such as mesh screen 58. The mesh screen 58 may be a cylindrical, polygonal, or flexible mesh screen (e.g., grills, porous media, or grates) on a peripheral side (e.g., circumferential) of the mesh screen assembly 42. The frame 56 and/or mesh screen 58 may be coupled to the first axial side 54 of the fan 38 with fasteners. As discussed above, the mesh screen 58 may have an opening 60 for the power transfer shaft 48. The opening 60 may enable the power transfer shaft 48 to couple to the fan 38 and the alternator 36 (e.g., the input shaft of the alternator 36).

The power transfer shaft 48 may be flexible to compensate for misalignment between the fan 38 and the alternator 36 in the system as a result of assembly and operation, for example. The shaft may include a steel/metal cable 62, a first adapter 64 (e.g., alternator adapter), a second adapter 68 (e.g., fan adapter), and/or a hex connector 70. The steel/metal cable 62 may include a rubber coating. The steel cable 62 may enable the shaft 48 to be flexible and compensate if the center of the impeller 50 is offset from the alternator 36 (e.g., the center of the shaft of the alternator). The first adapter 64 may couple the steel cable 62 to, for instance, a shaft 66 (e.g., input shaft) of the alternator 36. The first adapter 64 may be made of one or more pieces and/or include a spacer. The second adapter 68 may couple to the connector 70 to couple to a center of the hub to the fan motor 28. By having the power transfer shaft 48 and/or alternator 36 on the first side 54 (e.g., inlet side), less power is lost than having the shaft 48 and/or alternator 36 on the second side 52 using a belt and pulley system.

Figure 5:
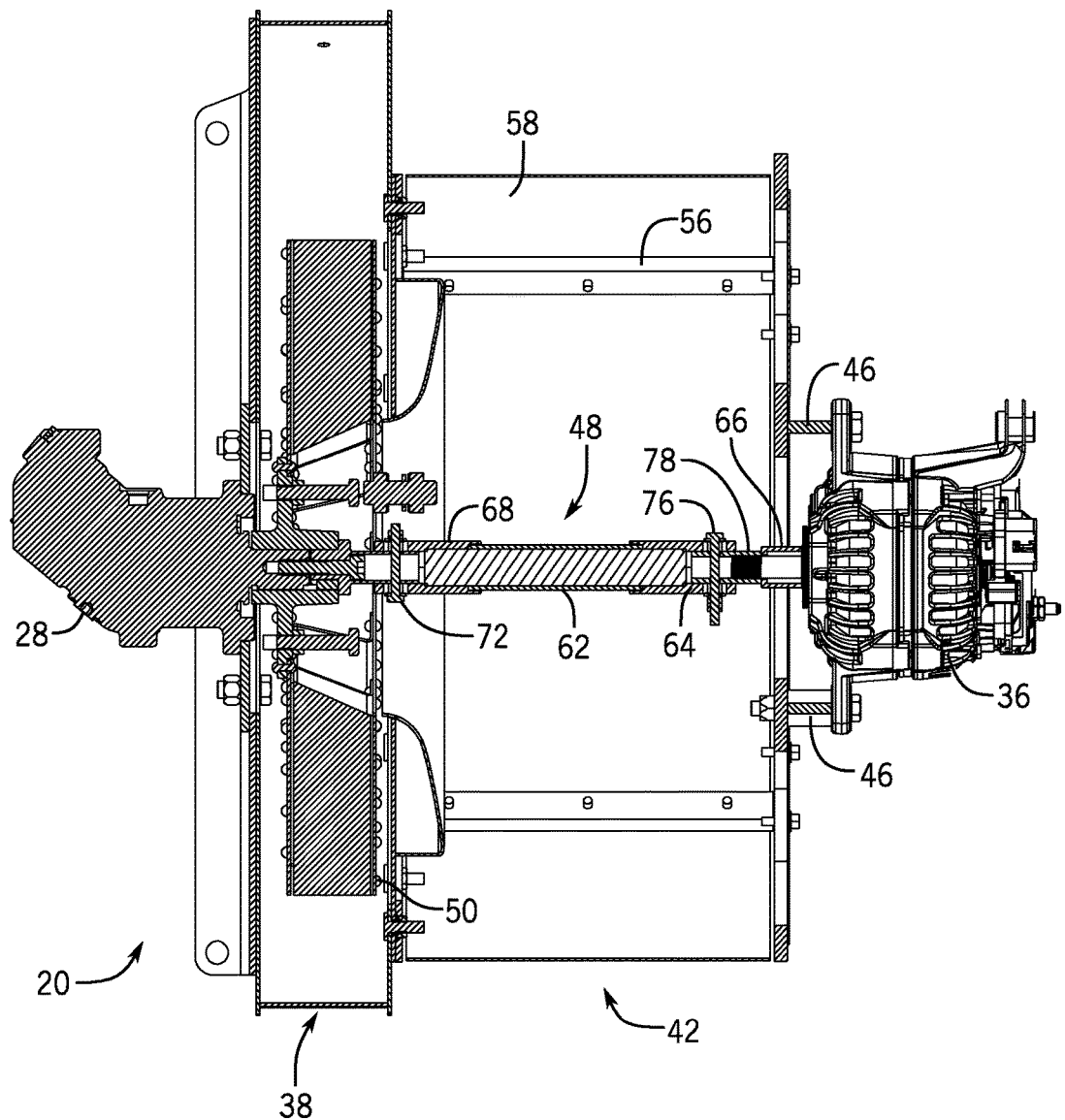
FIG. 5 is a cross sectional view of the drive system in FIG. 3, in accordance with an embodiment of the present disclosure.

FIG. 5 is a cross sectional side view of an embodiment of the drive system. As described above, the drive system includes the motor 28, the fan 38, the mesh screen assembly 42, the power transfer shaft 48, and the alternator 36. A first longitudinal end of the power transfer shaft 48 is coupled to the fan 38 at the center of the impeller 50 or the motor 28. The hex connector 70 is coupled to the second adapter 68 which is further coupled to a first end of the steel cable 62. Either coupling may be securing via a fastener 72. Further, the first adapter 64 may be coupled, via fastener 76 to a second end of the steel cable 62, opposite the first end. The first adapter may include threaded segment 78 (e.g., helical ridges) for threadingly engaging the alternator shaft 66. As such, the second longitudinal end of the shaft 48 is coupled to the alternator 36, opposite the first longitudinal end. While the impeller 38 rotates, the rotation drives the shaft 48, thereby driving the alternator 36.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An agricultural product distribution system, comprising:
   an alternator configured to supply electrical power to at least one component of the agricultural product distribution system;
   a fan configured to provide an air flow that fluidizes and transports particulate material throughout the agricultural product distribution system;
   a motor configured to drive the fan;
   a power transfer shaft non-rotatably coupled to an impeller of the fan, wherein the power transfer shaft is configured to transfer rotational energy from the motor to the alternator; and
   a mesh screen assembly having a frame, wherein the frame is coupled to the fan on a first side of the mesh screen assembly and coupled to the alternator on a second side of the mesh screen assembly, opposite the first side.

2. The agricultural product distribution system of claim 1, wherein the mesh screen assembly comprises a screen on a peripheral side of the mesh screen assembly.

3. The agricultural product distribution system of claim 1, wherein the mesh screen assembly comprises an opening configured to facilitate passage of the power transfer shaft through the mesh screen assembly.

4. The agricultural product distribution system of claim 1, wherein the power transfer shaft is flexible to facilitate misalignment between the fan and the alternator.

5. The agricultural product distribution system of claim 1, wherein the power transfer shaft is coupled to the impeller of the fan on a first side of the fan, and the motor is coupled to the fan on a second side of the fan, opposite the first side.

6. The agricultural product distribution system of claim 1, wherein the power transfer shaft is coupled to the impeller of the fan on a first longitudinal end of the power transfer shaft, and the power transfer shaft is coupled to the alternator on a second longitudinal end of the power transfer shaft, opposite the first longitudinal end.

7. The agricultural product distribution system of claim 6, wherein the power transfer shaft comprises a threaded segment coupled to an input shaft of the alternator on the second longitudinal end of the power transfer shaft, and the threaded segment couples the input shaft to a steel cable of the power transfer shaft.

8. An agricultural product distribution system, comprising:
- an alternator configured to supply electrical power to at least one component of the agricultural product distribution system;
- a fan configured to provide an air flow that fluidizes and transports particulate material throughout the agricultural product distribution system;
- a motor configured to drive the fan; and
- a power transfer shaft non-rotatably coupled to an impeller of the fan, wherein the power transfer shaft is configured to transfer rotational energy from the motor to the alternator.

9. The agricultural product distribution system of claim 8, wherein the power transfer shaft is flexible to facilitate misalignment between the fan and the alternator.

10. The agricultural product distribution system of claim 8, wherein the power transfer shaft is coupled to the impeller of the fan on a first side of the fan, and the motor is coupled to the fan on a second side of the fan, opposite the first side.

11. The agricultural product distribution system of claim 8, wherein the power transfer shaft is coupled to the impeller of the fan on a first longitudinal end of the power transfer shaft and the power transfer shaft is coupled to the alternator on a second longitudinal end of the power transfer shaft, opposite the first longitudinal end.

12. The agricultural product distribution system of claim 11, wherein the power transfer shaft comprises a threaded segment coupled to an input shaft of the alternator on the second longitudinal end of the power transfer shaft, and the threaded segment couples the input shaft to a steel cable of the power transfer shaft.

\* \* \* \* \*